(12) United States Patent
Challis

(10) Patent No.: US 6,373,475 B1
(45) Date of Patent: Apr. 16, 2002

(54) CONVERTER FOR RESISTIVE TOUCHSCREENS

(76) Inventor: Michael Challis, 30 Martinfield, Swindon, Wiltshire, SN3 5BN (GB)

(*) Notice: Subject to any disclaimer, the term of this patent is extended or adjusted under 35 U.S.C. 154(b) by 0 days.

(21) Appl. No.: 09/403,563
(22) PCT Filed: Apr. 15, 1998
(86) PCT No.: PCT/GB98/01904
  § 371 Date: Jan. 21, 2000
  § 102(e) Date: Jan. 21, 2000
(87) PCT Pub. No.: WO98/49650
  PCT Pub. Date: Nov. 5, 1998

(30) Foreign Application Priority Data

Apr. 25, 1997 (GB) .............................................. 9708464

(51) Int. Cl.⁷ .................................................. G09G 5/00
(52) U.S. Cl. ........................ 345/174; 345/173; 345/175; 345/176; 178/18.01; 178/18.02; 178/18.03; 178/18.04; 178/18.05; 178/18.06; 178/18.07
(58) Field of Search ................................. 345/174, 175, 345/176, 173; 178/18.01, 18.02, 18.03, 18.04, 18.05, 18.06, 18.07

(56) References Cited

U.S. PATENT DOCUMENTS

| 5,228,562 A | 7/1993 | Burk .......................... 200/512 |
| 6,163,313 A | * 12/2000 | Aroyan et al. .............. 345/173 |
| 6,278,444 B1 | * 8/2001 | Wilson et al. .............. 345/173 |

FOREIGN PATENT DOCUMENTS

| EP | 0631256 | 12/1994 |
| GB | WO 96/42068 | 12/1996 |

* cited by examiner

*Primary Examiner*—Richard Hjerpe
*Assistant Examiner*—Jean Lesperance

(57) ABSTRACT

A converter for connection between an electrographic sensor and an electrographic controller, and comprising:
  (a) a first set of contacts for connection to the sensor;
  (b) a second set of contacts for connection to the controller; and
  (c) an emulator for emulating at the second set of contacts:
    (i) a four-wire sensor when the first set of contacts is connected to a five-wire sensor and a second set of contacts is connected to a four-wire controller; and/or
    (ii) a five-wire sensor when the first set of contacts is connected to a four-wire sensor and a second set of contacts is connected to a five-wire controller.

18 Claims, 10 Drawing Sheets

Fig.6A.

|   | A | B | E | C | D |
|---|---|---|---|---|---|
| P |   |   |   |   | • |
| Q |   |   |   | • |   |
| T |   | • |   |   |   |
| R |   |   |   | • |   |
| S |   |   |   |   | • |

Fig.6B.

|   | A | B | E | C | D |
|---|---|---|---|---|---|
| P |   |   |   |   | • |
| Q |   |   |   | • |   |
| T |   | • |   |   |   |
| R |   |   |   | • |   |
| S |   |   |   |   | • |

Fig.6C.

|   | A | B | E | C | D |
|---|---|---|---|---|---|
| P | • |   |   |   |   |
| Q | • |   |   |   |   |
| T |   |   |   | • |   |
| R |   | • |   |   |   |
| S |   | • |   |   |   |

Fig.7A.

|   | A | B | E | C | D |
|---|---|---|---|---|---|
| P | • |   |   |   |   |
| Q |   | • |   |   |   |
| T |   |   |   |   |   |
| R |   |   | • |   |   |
| S |   |   | • |   |   |

Fig.7B.

|   | A | B | E | C | D |
|---|---|---|---|---|---|
| P | • |   |   |   |   |
| Q |   | • |   |   |   |
| T |   |   |   |   |   |
| R |   |   | • |   |   |
| S |   |   | • |   |   |

Fig.7C.

|   | A | B | E | C | D |
|---|---|---|---|---|---|
| P |   |   | • |   |   |
| Q |   |   | • |   |   |
| T |   |   |   |   |   |
| R | • |   |   |   |   |
| S |   |   |   | • |   |

Fig.8A.

|   | A | B | E | C | D |
|---|---|---|---|---|---|
| P | • |   |   |   |   |
| Q |   | • |   |   |   |
| T |   |   | • |   |   |
| R |   |   |   | • |   |
| S |   |   |   |   | • |

Fig.8B.

|   | A | B | E | C | D |
|---|---|---|---|---|---|
| P | • |   |   |   |   |
| Q |   | • |   |   |   |
| T |   |   | • |   |   |
| R |   |   |   | • |   |
| S |   |   |   |   | • |

Fig.8C.

|   | A | B | E | C | D |
|---|---|---|---|---|---|
| P | • |   |   |   |   |
| Q |   | • |   |   |   |
| T |   |   | • |   |   |
| R |   |   |   | • |   |
| S |   |   |   |   | • |

Fig.9A.

|   | A | B | E | C | D |
|---|---|---|---|---|---|
| P |   |   |   |   | • |
| Q |   |   |   | • |   |
| T |   |   |   |   |   |
| R | • |   |   |   |   |
| S |   | • |   |   |   |

Fig.9B.

|   | A | B | E | C | D |
|---|---|---|---|---|---|
| P |   |   |   |   | • |
| Q |   |   |   | • |   |
| T |   |   |   |   |   |
| R | • |   |   |   |   |
| S |   | • |   |   |   |

Fig.9C.

|   | A | B | E | C | D |
|---|---|---|---|---|---|
| P |   |   |   |   | • |
| Q |   |   |   | • |   |
| T |   |   |   |   |   |
| R | • |   |   |   |   |
| S |   | • |   |   |   |

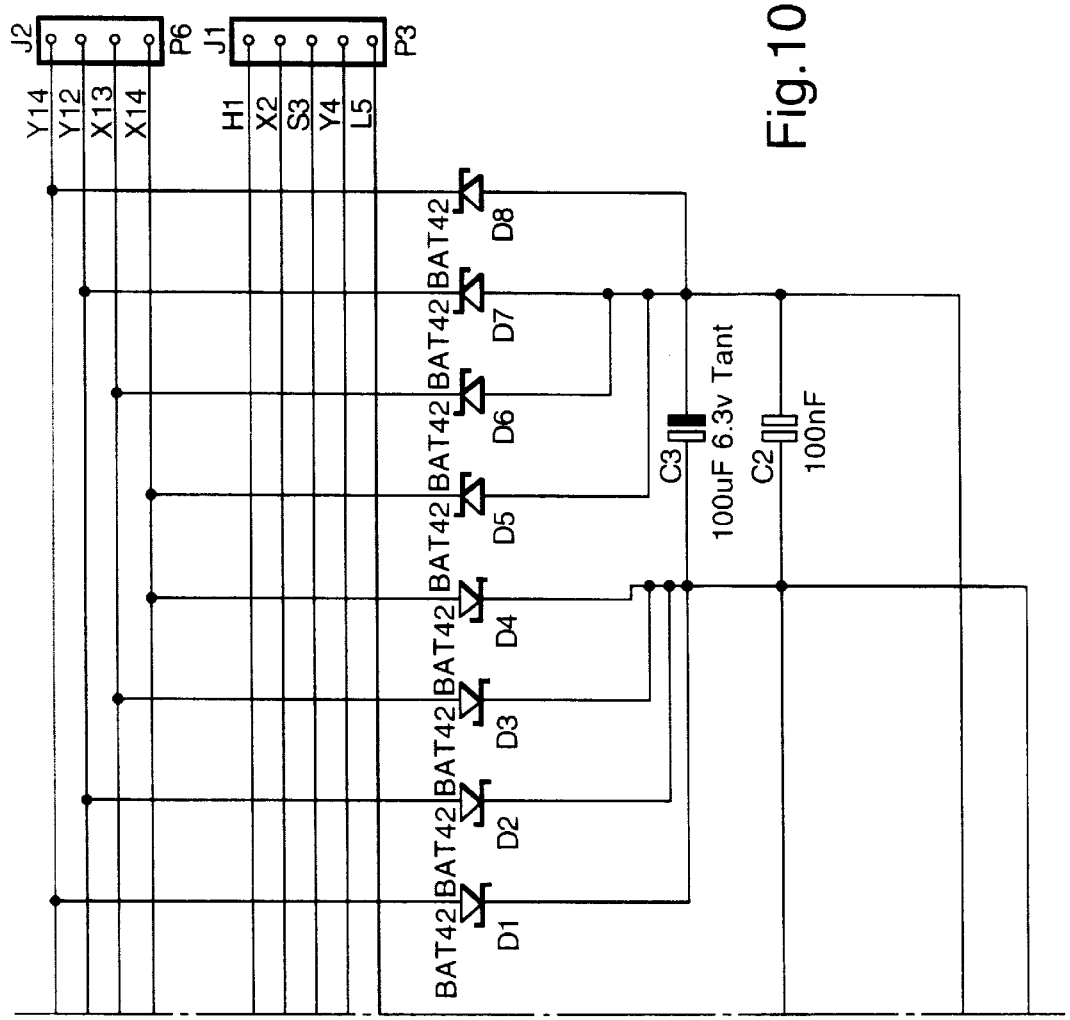

CONVERTER FOR RESISTIVE TOUCHSCREENS

The present invention relates to touchscreens and other electrographic sensors. An electrographic sensor is a device for determining the co-ordinates of an event, generally in a two-dimensional system, or for inputting such co-ordinates into, for example, a computer.

Such devices in the form of touchscreens have become widely used for inputting information into computers, as a means of operating cash dispensers, sales tills, ticketing machines, computer games and medical and industrial instrumentation. They have many advantages including speed and ease of use, small size, reliability, and accuracy.

A touchscreen will usually be used in conjunction with some form of display such as a cathode ray tube or a liquid crystal screen. The touchscreen is placed over such a display and can indicate to a computer controlling the display which icon or other element of the display has been selected by the user.

Various types of touchscreen have been produced, each with its own advantages and disadvantages. For example, touchscreens may make use of capacitance, surface acoustic waves, or resistance. It is with the last of these possibilities that I am now concerned.

Resistive touchscreens employ transparent layers of a resistive material which come into contact with one another when the screen is touched. This contact completes a circuit, the resistance of which depending on the position where the contact was made. As a result, the magnitude of the output from the touchscreen will depend on the position of the touch.

Touchscreens themselves are used in conjunction with a controller which applies the desired voltages to the various resistive layers, and also passes the output of the screen, generally after digitising it, to the computer or other device to be controlled. Two main types of resistive touchscreen exist, the so-called five-wire and four-wire screens, and each type has hitherto required its own type of controller.

In order to explain this need for a particular type of controller, the two forms of screen will be described in more detail.

Four-wire touchscreens are widely available but they have the disadvantage of a shorter life than five-wire screens. Typically a four-wire screen will be rated to survive one million touches, whereas a five-wire screen will be rated to survive, say, fifteen million or more touches. This difference arises because in the case of a four-wire screen the resistance across the surface of the top, deformable, layer is critical. This resistance will vary slightly as the screen degrades through use. In the case of a five-wire screen the top, deformable, layer must remain conductive, but its precise resistance is not important. As a result, the screen will continue to function unless the screen becomes so damaged that all conductive pathways are lost.

A four-wire screen consists of two transparent, resistive layers separated by a grid of minute dots. The lower layer may be rigid, but the upper layer will be flexible so that when the screen is touched the two layers come into contact between adjacent dots where the screen is touched. The lower layer may be provided with electrodes running along its left and right edges (for example). When a potential difference is applied between those electrodes a voltage gradient will be produced from left to right. A voltage picked up by contacting this layer will therefore have a magnitude that depends on the position of contact. In this example the voltage gradient extends from left to right and therefore the voltage picked up will provide an X-co-ordinate of position. In this example, the upper layer will have electrodes along its top and bottom edges (picture the layers in the vertical plane in front of you), and analogously a voltage difference applied between those electrodes will give rise to an output whose magnitude depends on the Y-co-ordinate of the position of touch. The circuits are completed as follows. When the X-co-ordinate is being measured the left-hand electrode on the lower layer is connected to ground, the right-hand, electrode on the lower layer is connect to (say) 5 V, and the two electrodes of the upper layer are connected together. The voltage between those two electrodes and ground is then measured. When the screen is touched a voltage will be produced that is somewhere between 0 V and 5 V, depending on the X-co-ordinate of the position of touch. It will be appreciated that the voltage will be independent of the Y-co-ordinate of the touch.

The connections are now altered in order to measure the Y-co-ordinate. The left and right-hand electrodes of the lower layer are now connected together, and a potential difference is applied between the two electrodes of the top layer. The output will of course be the voltage appearing at the combined electrodes of the bottom layer.

The device that applies these voltages and that measures the output voltage when the screen is touched is the so-called controller that was referred to above.

The controller has a further function, namely touch detection. It can be seen that power is consumed continuously while the screen and controller are in the above X-measurement and Y-measurement states. In the X-measurement state, for example, a potential difference is maintained across the lower layer and current will flow whether or not the screen is being touched. The waste of power is considerable since for most of the time the screen will not be being touched. In the touch detection state the controller applies, say, 5 V to both the left and right electrodes on the bottom layer, and connects together the two electrodes of the top layer. No current will flow since there is no potential difference across either of the layers. When the screen is touched the controller detects a voltage at the combined electrodes of the top layer. This causes the controller to re-organise its connections to the screen to apply a potential difference between the left and right electrodes on the bottom layer and make the X-measurement as described above. Once this is done the controller re-organises the connections again to apply a potential difference between the electrodes on the top layer to make the Y-measurement. It may repeat these two measurements one or more times to avoid spurious readings, and then it will return to the touch detection state and await a further touch.

The voltage measurements may be made in any suitable way, but generally an analogue-digital converter (ADC) will be used to produce a digitalized output to be fed to the computer to be controlled by the touchscreen.

A five-wire touchscreen operates in a different, and apparently incompatible, way to that described above. The five wires are connected in the following way. Four of them are connected to the four comers of the lower electrode and the fifth wire is connected to an arbitrary position on the upper electrode. In the touch detection state the four wires to the bottom electrode are connect to, say, 5 V. Detection of a voltage at the top layer indicates that the screen has been touched. This then causes the five-wire controller to switch to its X-measurement state as follows. In this state the top and bottom left-hand comers (again imagine the layer in the vertical plane in front of you) are connected to ground, and the top and bottom right-hand corners are connected to, say, 5 V. Depending on the resistance of the lower layer, the field lines across the lower layer will be considerably curved. A specially designed resistive buss may be provided between adjacent pairs of corners of the lower layer in order to make these field lines more rectilinear. This is disclosed in U.S. Pat. No. 4,661,655 (Gibson et al) the disclosure of which is incorporated herein by reference, and excellent touch screens of this type are marketed by Elo TouchSystems Inc. The nature of any such bussing is not important to the present invention and will not therefore be described further. With the touchscreen and controller in the X-measurement state it can be seen that the voltage appearing on the top layer will be related to the X-co-ordinate of the touch on the screen. Once this measurement has been made the controller and screen switch to the Y-measurement state where the top left and top right corners are connected to, say, 5 V and the bottom left and right corners are connected to ground. Now the voltage on the top layer will give an indication of the Y-co-ordinate of a touch on the screen.

I have discovered that it is possible, and indeed useful, to provide the ability for a five-wire screen to be connected to a four-wire controller, and vice versa. This allows optimum independent selection of screen and controller, and allows part of a system to be upgraded thus avoiding the need for total replacement. Furthermore it makes equipment more compatible with other equipment thus simplifying overall design.

I have found that this can be achieved by providing a converter which can be connected between a screen and a controller, either as an independent piece of equipment or as an add-on to, or as a modification of, either a screen or a controller.

Thus, the present invention provides a converter for connection between an electrographic sensor and an electrographic controller, and comprising:

(a) a first set of contacts for connection to the sensor;

(b) a second set of contacts for connection to the controller; and (c) an emulator for emulating at the second set of contacts:
  (i) a four-wire sensor when the first set of contacts is connected to a five-wire sensor and the second set of contacts is connected to a four-wire controller; and/or
  (ii) a five-wire sensor when the first set of contacts is connected to a four-wire sensor and the second set of contacts is connected to a five-wire controller.

In a preferred embodiment both of possibilities (i) and (ii) are provided for. Furthermore, the emulator may additionally emulate at the second contacts:

(iii) a five-wire sensor when the first set of contacts is connected to a five-wire sensor and the second set of contacts is connected to a five-wire controller; and/or (iv) a four-wire sensor when the first set of contacts is connected to a four-wire sensor and the second set of contacts is connected to a four-wire controller.

Where all these possibilities are provided for the converter will be fully universal, in that either type of sensor may be connected to either type of controller. I prefer that the converter be able automatically to determine which type of sensor and which type of controller are connected to it. To this end the converter may additionally comprise:

(d) a first device that can determine which of a four- and five-wire sensor is connected to the first set of contacts and/or which of a four- and five-wire controller is connected to the second set of contacts; and which can, at least in part from such determination, cause the emulator to effect an appropriate emulation.

Alternatively or additionally, the converter may comprise:

(e) a second device that can determine which of a sensor and a controller is connected to one of the sets of contacts; and which can, at least in part from such determination, cause the emulator to effect an appropriate emulation.

The risk of connecting the sensor and controller to the wrong sets of contacts can therefore be eliminated.

In general the controller may be provided with two sets of five contacts for example in the form of five-pin plugs and/or five-pin sockets.

The emulation carried out by the converter may consist simply in forming appropriate (direct or indirect) interconnections between the first set of contacts and the second set of contacts. However, in some cases it may be preferred that the emulation consist in reading a signal at a contact of one of the first and second sets of contacts and then writing an appropriate signal to a contact of the other of the first and second sets. This second possibility might be desirable where the sensor requires different voltages or source impedances etc, in addition to different patterns of interconnection, from that provided by the controller.

It was explained above that an electrographic controller passes through several different states, namely touch detection, X-measurement and Y-measurement. In general the converter of the invention will have first, second and third states corresponding to these states of the sensor and controller. Alternatively, a separate converter could be provided for each state and the controller could switch between them. The converter is preferably controlled by the controller and simply follows the changes that occur in the controller. I prefer that the emulator be caused to switch between its states by signals from the controller at the second set of contacts. Thus the standard output (which in the absence of the controller of the invention would be connected directly to the sensor) provides all the information necessary for the controller to change states. An alternative would be to provide some additional connection between controller and converter but this is not at present preferred.

The standard output from the controller preferably also provides all the power necessary for the emulator to effect the appropriate emulation and switching between states. I also prefer that the standard output provide any voltage references needed.

In order to increase reliability of the converter it may be desirable that in the absence of any power the emulator return to its touch detection state. To this end the emulator preferably has switches whose states constitute the state of the emulator, the normal states (ie those states which result from the absence of any applied power and/or the dissipation of any charge) of those switches corresponding to the first, ie touch detection state, of the emulator.

Before a preferred embodiment of the invention is discussed in detail, I will summarise the operation of a fully universal controller of the invention.

On connection of a sensor to one set of contacts and a controller to another set of contacts of the converter, the converter:

(i) determines to which of said sets is connected the sensor and to which of said sets is connected the controller;

(ii) determines whether the sensor is a four-wire sensor or a five-wire sensor;

(ii) determines whether the controller is a four-wire controller or a five-wire controller; and (iv) causes the emulator to adopt first, second and third states appropriate to the type of sensor and the type of controller connected and according to the state from time to time adopted by the controller.

The controller need not be fully universal in this sense. For example, it could have separate sets of contacts dedicated to the type of equipment to be connected, or it could have switches or other means of control to be operated by the user depending on the type of equipment that is connected.

Where the controller makes the above determinations automatically, a variety of techniques may be used which, in the light of the present specification, the skilled reader will be readily able to devise. For example, the controller may be able to determine whether a sensor or a controller is connected to a given set of contacts by determining whether a voltage exists between any contacts of that set. If a voltage is detected the equipment will be a controller.

Measurement of the resistance between pairs of contacts to which a sensor is detected will determine whether the sensor is a four-wire sensor or a five-wire sensor. Also, a four-wire controller may be distinguished from a five-wire controller by determining voltages between pairs of said contacts.

The controller of the invention may be provided as a separate or free-standing, piece of equipment or it maybe pre-connected to or part of a sensor or pre-connected to or part of a controller.

The invention is further illustrated by the accompanying drawings, in which:

FIGS. 6a, 6b and 6c show three states of a controller for connection between a five-wire screen and a four-wire controller;

FIGS. 7a, 7b and 7c show three states of a controller for connection between a four-wire screen and a five-wire controller;

FIGS. 8a, 8b and 8c show three states of a controller for connection between a five-wire screen and a five-wire controller;

FIGS. 9a, 9b and 9c show three states of a controller for connection between a four-wire screen and a four-wire controller;

Figure 1:
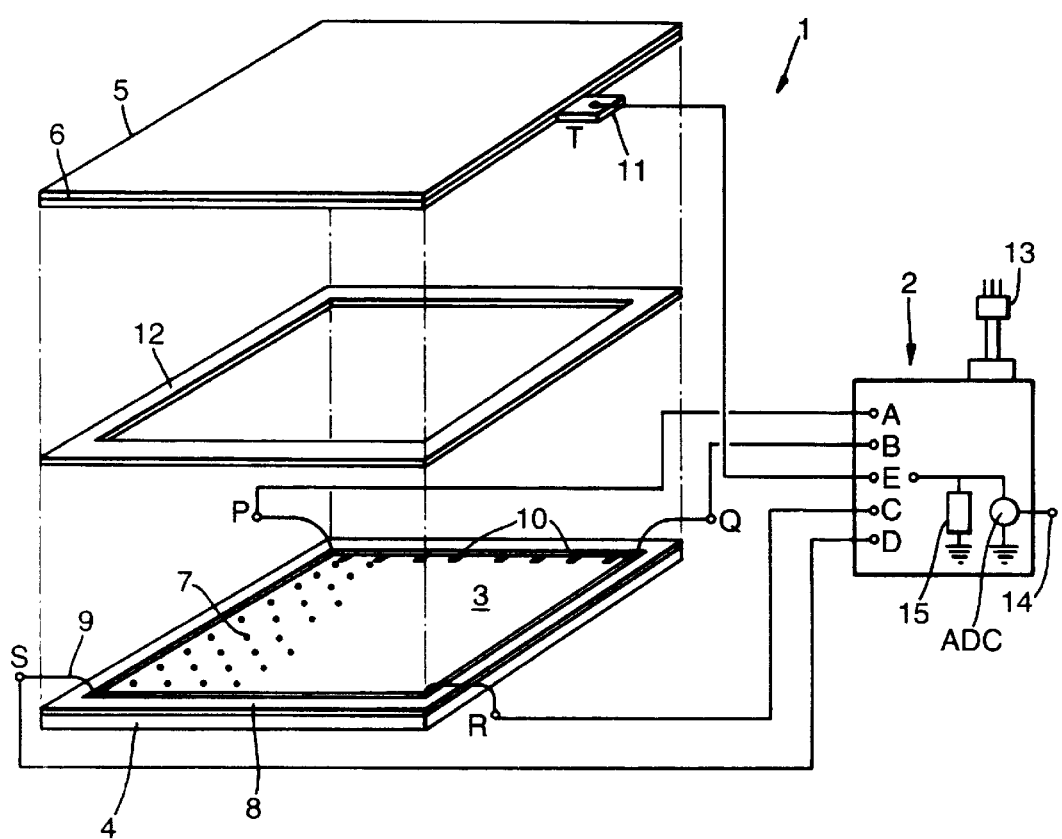
FIG. 1 shows a prior art five-wire touchscreen connected to a five-wire controller.

The touchscreen shown in exploded form in FIG. 1 is taken from U.S. Pat. No. 4,661,655. A touchscreen 1 is connected by various conductors to a controller 2.

The screen is shown in exploded form and its vertical dimensions are greatly exaggerated. A uniform resistive surface 3 is applied to a suitable substrate 4. The substrate may be planar (as shown), or contoured to match the face of a curved object such as a conventional video display screen. An opaque sensor may be produced using for example resistive inks as the resistive coating which may typically have a sheet resistivity between 10 and 10,000 ohms per square. More usually, however, the resistive coating and substrate will be substantially transparent in order that the sensor be usable as a touchscreen. For such a device the resistive layer is typically a semiconducting metal oxide such as indium tin oxide. Again typical resistivities lie between 10 and 10,000 ohms per square. Further details of such resistive coatings may be found in U.S. Pat. No. 4,220,815, the disclosure of which is incorporated herein by reference.

Spaced above the resistive coating is a contact or pickoff sheet typically comprising a flexible film 5 having a conductive coating 6 on its underneath surface. Again, if the resulting sensor is to be transparent, the conductive coating must also be transparent. The flexible film 5 may comprise a plastic such as polyester or polycarbonate, or it may be elastomeric. The conductive coating 6 should have a similar flexibility to that of the flexible film, and its resistivity is typically less than 1,000 ohms per square.

In the normal state of the screen, ie when it is not being touched, the lower resistive layer 3 should remain separated from the upper resistive layer 6. Means are therefore provided to maintain separation between these layers unless the screen is touched or unless a pre-selected pressure is otherwise applied at a particular point. Preferably the separating means comprises a plurality of minute dots 7 of insulating material, some of which are shown in the figure. Such dots and other insulating means are disclosed in U.S. Pat. No. 4,220,815 and U.S. Pat. No. 3,798,370, the disclosures of which are incorporated herein by reference.

Spaced along each edge of the resistive coating 3, but insulated therefrom, is a resistor element 8 used to apply voltages to the resistive layer. This resistor element may be continuous, as shown, or in the form of discrete units connected in series. The resistor element may comprise four components, one along each edge, joined at the comers of the screen. At each corner an electrical lead 9 is provided for connection of the screen to the controller 2.

U.S. Pat. No. 4,661,655 discloses a plurality of electrodes 10 along selected paths adjacent each edge of the resistive coating 3 and in contact therewith. These electrodes 10 are provided so as to achieve varying effective voltage gradients in the resistive coating 3 to compensate for the voltage drop along the resistive element 8. Accordingly, the effective voltage gradients in the coating 3 decrease progressively from corners of the screen towards the centre of each path as the voltage drop increases along the resistive element 8. These effects, voltage gradient and voltage drop, are made to balance one another to make the voltage gradients rectilinear.

The screen also includes an electrode 11 for connection of the upper resistive layer 6 to the controller 2. The upper film 5 and resistive layer 6 may be joined to the lower layers through an insulating adhesive frame 12.

The controller 2 has means 13 for connecting it to a power supply 13 and has a digital or other output 14 for connection to a computer or other device that is to process the positional information obtained from the touchscreen. That digital output may be obtained from an analogue-digital converter (ADC) within the controller 2 that digitizes a voltage measured across a high impedance 15 connected between the upper resistive layer 6 and ground.

The various contacts on the screen and on the controller will be referred to below in order to explain the various states of the converter of the invention. It can be seen that the comers of the lower resistive layer 3 of the screen are connected to contacts P, Q, R and S, and the upper conductive layer 6 is connected to terminal T. The terminals of the controller are labelled A, B, C, D and E with terminal E being connected to the ADC that produces the ditigized output.

Figure 2:
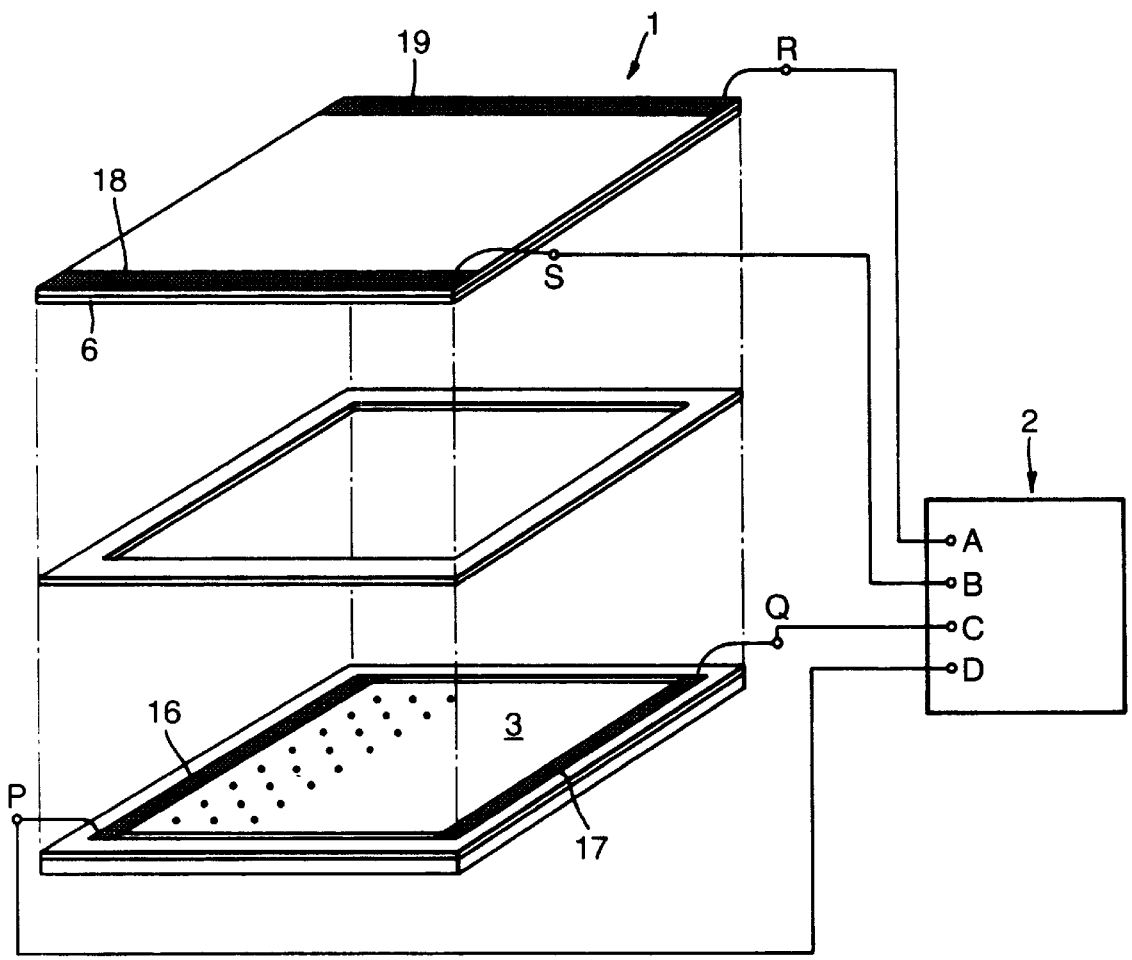
FIG. 2 shows a four-wire touchscreen connected to a four-wire controller.

FIG. 2 shows a four-wire screen 1 connected to a four-wire controller 2. In this case the lower resistive layer 3 has simple bussing electrodes 16, 17 at its left and right-hand edges. Similarly the upper resistive layer 6 has bussing electrodes 18 and 19 at its bottom and top edges respectively (as drawn).

Figure 3A:
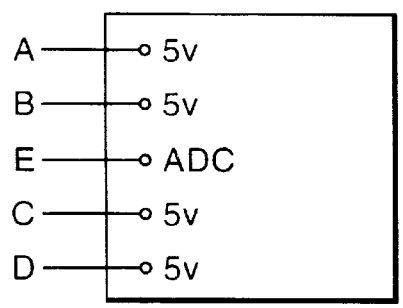
FIGS. 3a, 3b and 3c show three states of a five-wire controller.
Figure 3B:
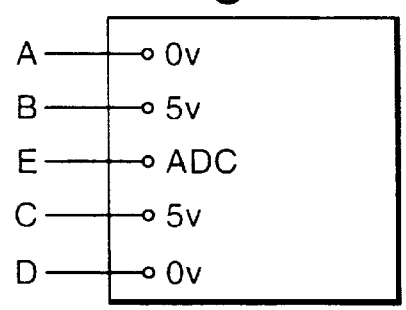
Figure 3C:
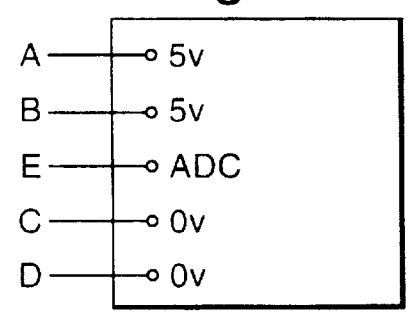

FIGS. 3a, 3b and 3c show three states of the five-wire controller of FIG. 1. The state shown in FIG. 3a is the touch detection state. Here, contacts A, B, C and D are provided with 5 volts and contact E is connected to the ADC which provides an output to the computer. These five contacts are connected to the screen as shown in FIG. 1.

A 0 volt reference may be taken from the ADC or provided separately. When the screen is touched a contact is made between the lower resistive layer 3 and the upper resistive layer 6 which causes a voltage to appear at contact E which is detected by the ADC and causes the computer to switch the controller to the second state, that is illustrated in FIG. 3b. This state is for measurement of the X-co-ordinate of the position of the touch of the screen. In-this state contacts A and D are connected to 0 volts and contacts B and D are connected to 5 volts. Contact E remains connected to the ADC. It can be seen that in this state a potential gradient exists across the resistive layer 3 from left to right as drawn in FIG. 1. The value of the voltage detected by the ADC will be a function of the X-co-ordinate of the position of touch. After a pre-determined time, or after some other triggering, the controller switches to its third state, namely that shown in FIG. 3c. Here contacts A and B are provided with 5 volts and contacts C and D are provided with 0 volts. Again contact E remains connected to the ADC. In this state the Y-co-ordinate of the position of touch will be recorded. I prefer that the controller makes several X and Y-measurements before returning to the touch detection state. This ensures that spurious determinations of position are not made, particularly where the position of touch is rapidly altered.

Figure 4A:
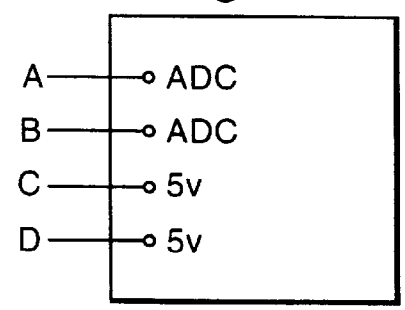
FIGS. 4a, 4b and 4c show three states of a four-wire controller.
Figure 4B:
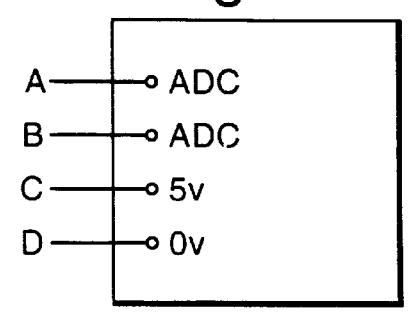
Figure 4C:
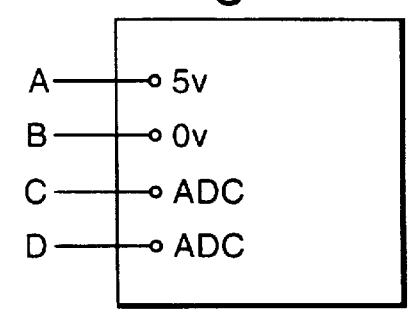

FIGS. 4a, 4b and 4c are analogous to FIGS. 3a, 3b and 3c, but show the states of a four-wire controller.

Figure 5:
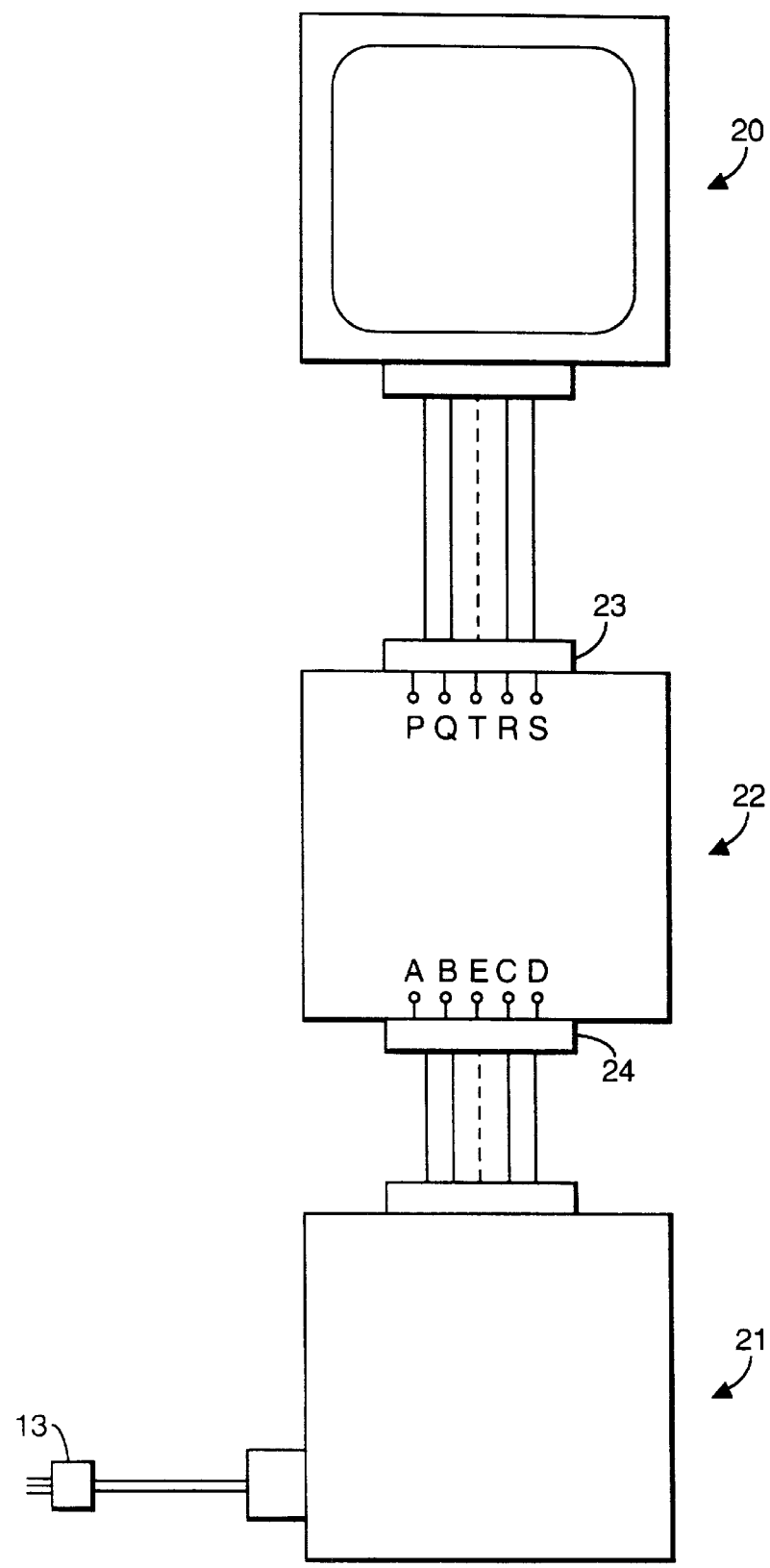
FIG. 5 shows a converter of the invention connected between a touchscreen and a controller.

By use of the converter of the invention the five-wire screen of FIG. 1 may be used with the four-wire controller of FIG. 2 and/or the four-wire screen of FIG. 2 may be used with the five-wire controller of FIG. 1. This is illustrated schematically in FIG. 5 which shows a touchscreen 20 connected to a controller 21 via a converter 22 of the invention. The converter 22 is shown having a plug or socket 23 for connection to the screen and a plug or socket 24 for connection to the controller. Each of these plugs or sockets is preferably provided with five contacts in order that the converter be fully universal. Whether or not the fifth contact is used will, of course, depend on whether the screen and/or the controller are of the five-wire or of the four-wire designs. For this reason the fifth connection is shown as a dotted line in each case. The whole system is preferably powered through the controller 21, and for this purpose a means 13 for connecting to a source of power is shown. Alternatively, however, the converter 22 may have its own source of power.

FIGS. 6, 7, 8 and 9 are state diagrams illustrating the function of the converter depending on the type of screen, the type of controller and the state of the controller.

In FIG. 6 the converter is used to connect a five-wire screen to a four-wire controller.

FIG. 6a shows connections that the controller makes between the contacts A, B, C, D, E of a four-wire controller to the contacts P, Q, R, S, T of a five-wire screen. The dots indicate where connections are made. Such a state diagram may also be used to indicate the state of a converter that reads signals from one set of contacts and writes appropriate signals to the other set of contacts. Thus, the diagram indicates that a connection is made between contact P of the screen (the top left-hand corner of the screen in FIG. 1) and contact D of the controller shown in FIG. 2, the touch detection state of which being shown in FIG. 4a. Alternatively, the diagram could represent that the signal at contact D (which FIG. 4a indicates as being 5 volts) is read by the converter and a corresponding signal is written to contact P of the screen. The pattern shown in FIG. 6a is only an example, and it will be seen that other patterns will allow the converter to effect the appropriate emulation. This arises because of the duplication in the controller of certain signals. For example in FIG. 4a two contacts, A and B, are connected to the ADC, and two contacts C and D, are connected to 5 volts.

FIG. 6b shows the pattern of interconnections or read and write arrangements that the converter adopts when the X-co-ordinate is to be measured. In this case, as mentioned above, the controller is in the state indicated in FIG. 4b. Finally, FIG. 6c is the state diagram appropriate to measurement of the Y-co-ordinate, when the controller will be in the state indicated in FIG. 4c.

It is possible that other states of the controller will be desirable in order that other functions be carried out, and the skilled reader will readily be able to construct a state diagram for the converter which corresponds to the emulation required. FIGS. 7a, 7b and 7c correspond to FIGS. 6a, 6b and 6c, but here a four-wire screen is connected to a five-wire controller.

FIGS. 8a, 8b and 8c show the trivial states required of a converter connected between a five-wire screen and a five-wire controller. FIG. 9a, 9b and 9c does the same thing for a converter connected between a four-wire screen and a four-wire controller.

I prefer that the converter receive all its information from the controller through the contacts A, B, C, D and E. The controller would then monitor, for example, the voltages on these contacts, and set its own state accordingly. For example, if a converter positioned between a five-wire screen and a four-wire controller detected 5 volts on two of pins A, B, C, D and E and no voltages on the other three pins, then it would know that the controller was in the touch detection state (compare FIGS. 4a, 4b and ac), and it would set its state to that shown in FIG. 6a. Clearly if the controller has been told which of contacts A, B, C, D and E are which, they the investigation that it needs to make is reduced. My preferred converter will therefore constantly monitor the state of the contacts connected to the controller and will automatically alter its state to provide the emulation required. It is of course desirable that the converter be capable of switching between its states faster than the controller switches between its states. In an alternative embodiment, the controller provides the converter with a signal instructing it to alter its state that is independent of the standard contacts A, B, C, D and E intended for controlling the screen.

Figure 10:
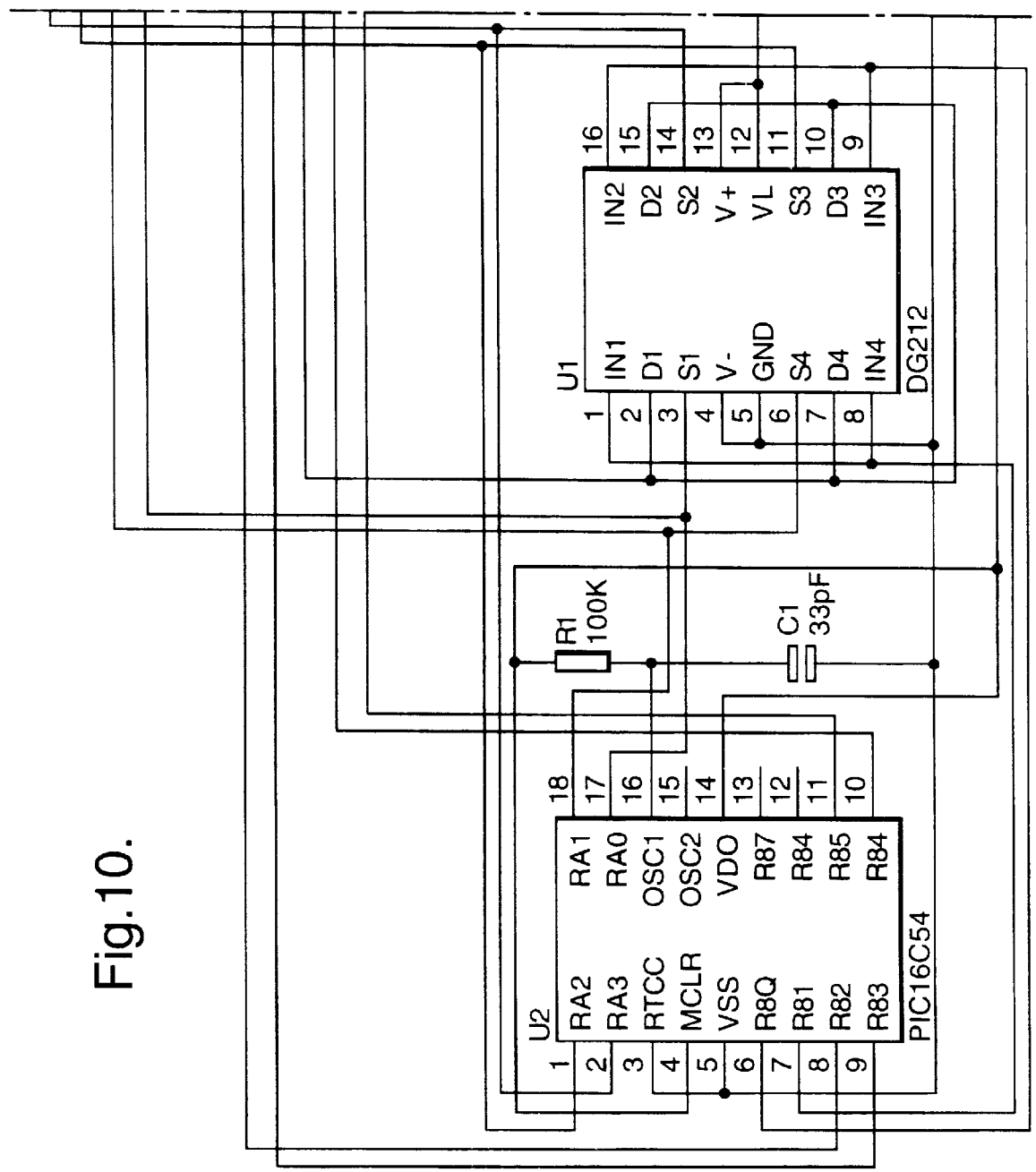
FIG. 10 is a circuit diagram of a preferred controller.
Figure 11:
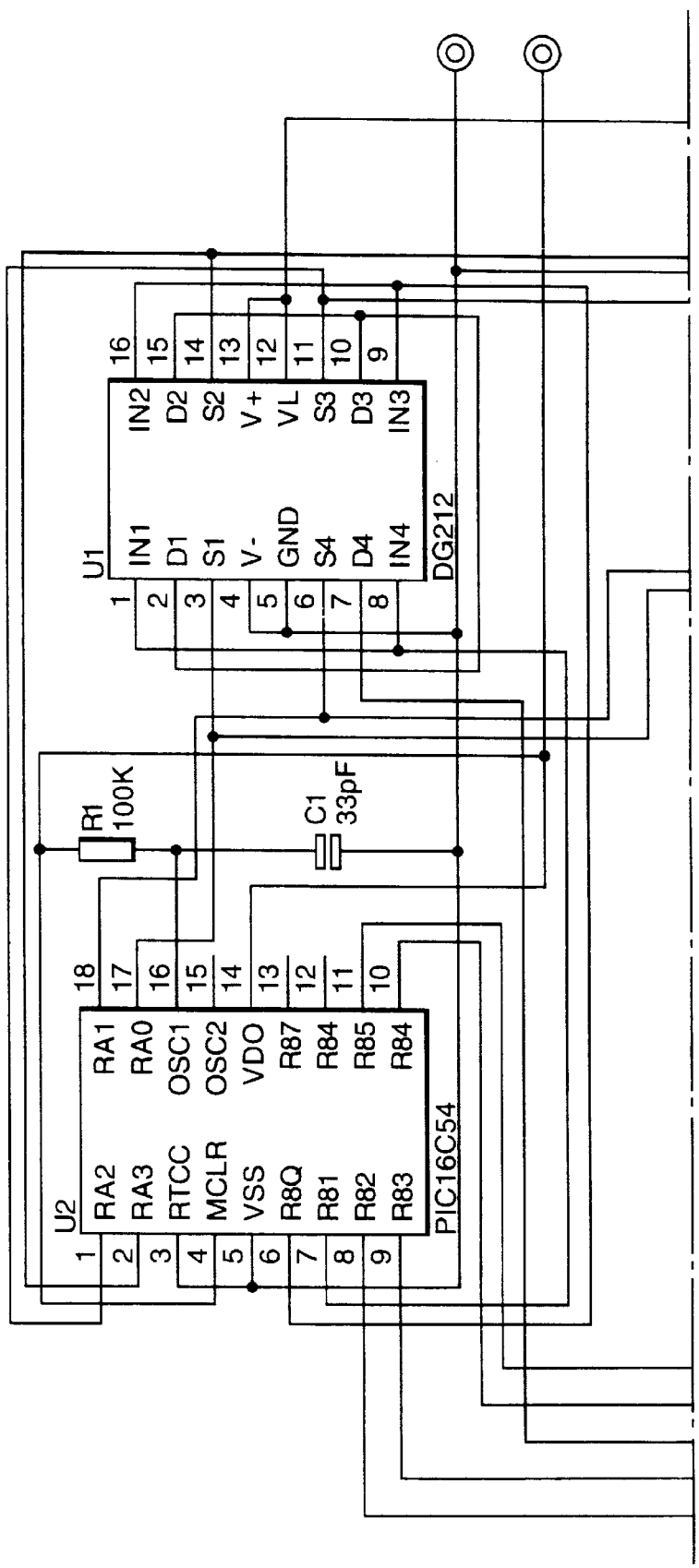
FIG. 11 shows such a controller connected between a five-wire screen and a four-wire controller.
Figure 11:
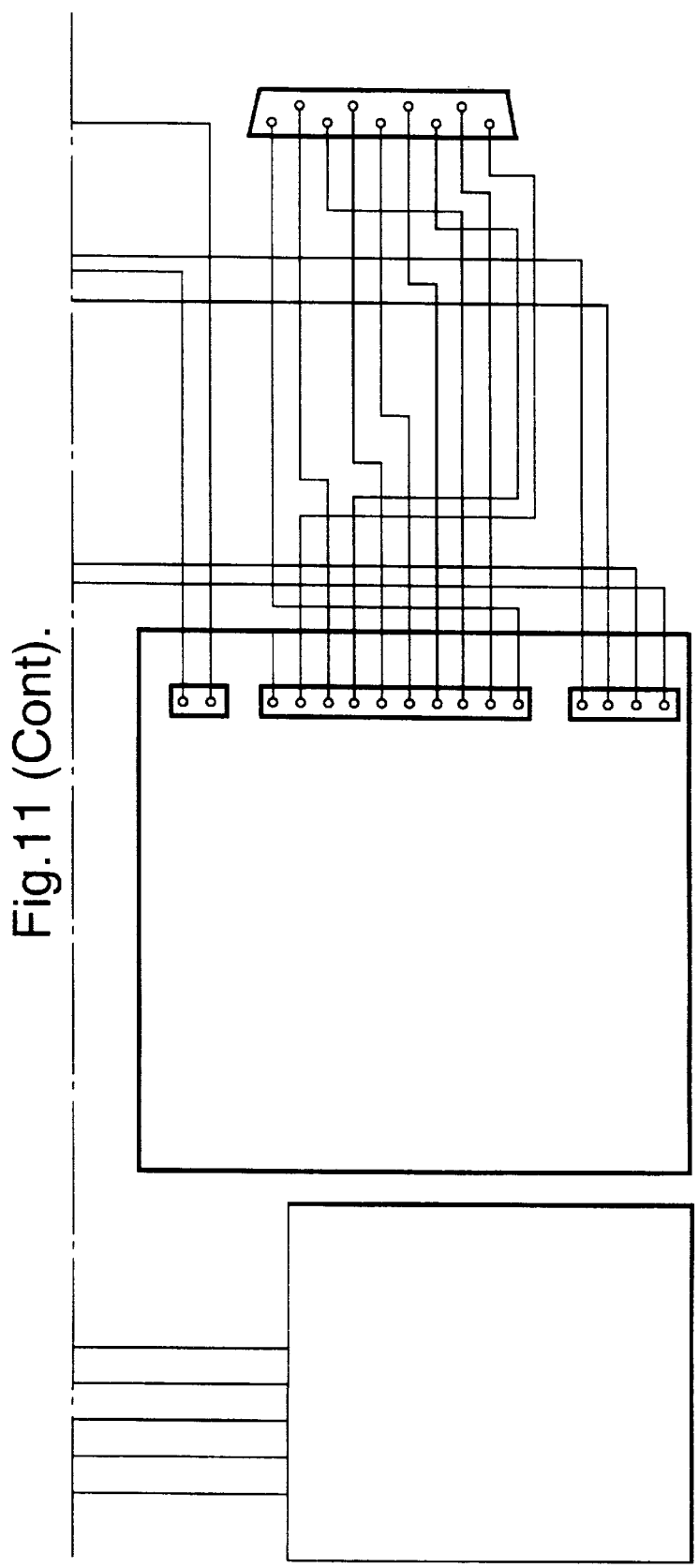

FIG. 10 shows a preferred converter circuit that uses a state machine to provide the desired variety of interconnections between controller and screen, and also to power the screen. In the embodiment illustrated the converter connects a five-wire screen to a four-wire controller, but an analogous circuit could be used for other arrangements. The state machine is code which resides in a PIC16C54 microcontroller. A four channel single-pole-single-throw (SPST) analogue switch is controlled by the microcontroller. This switches the upper resistive layer (layer 6 of FIG. 1) to the appropriate contact of contacts A, B, C and D of the controller (see FIG. 2 and FIGS. 4a, 4b and ac.). Here the controller is simply waiting to detect when the screen is touched. The converter responds to this state by applying 5 volts to the four corners P, Q, R, S of the screen, and uses the analogue switches to connect the upper resistive layer to contacts A and B of the controller. As mentioned above, when the screen is touched the controller cycles through a sequence of X and Y-measurements, interspersed with touch detection checks.

An X-co-ordinate measurement begins when the controller sets contact C to 5 volts and contact D to 0 volts. The converter detects this state and places 5 volts on corners Q and R of the five-wire screen, 0 volts on corners P and S, and at the same time switches the upper resistive layer 6 to contacts A and B.

A Y-co-ordinate measurement begins when the controller sets contacts B to 5 volts and contact A to 0 volts. The converter then detects this state and places 5 volts on corners P and Q of the screen, and 0 volts on corners S and R, and at the same time switches the upper resistive layer to contact C and D.

FIG. 2 shows the touch screen, the four-wire controller and the converter. In the embodiment shown the converter is powered by an external low current 5 volts supply, although as mentioned above power could be derived from the standard contacts of the controller. This latter arrangement is preferred for a number of reasons, in particular it allows the converter to be constructed in the housing of the screen itself, or in a connector therefor, and avoids the need for further interconnections.

Whilst various mircoprocessors and various programmes can be uses for operating the converter of the present invention, the following programme applicable to a PIC16C54 mircocontroller has been found to be suitable.

LISTING 1

PIC16C54

General Equates

| INDADD | EQU 0 | ;INDIRECT ADRESSING REGISTER |
| --- | --- | --- |
| RTCC | EQU 1 | ;COUNTER |
| PC | EQU 2 | ;PROGRAM COUNTER |
| STATUS | EQU 3 | ;STATUS REGISTER |
| FSR | EQU 4 | ;FILE SELECT REGISTER |
| PORTA | EQU 5 | ;PORT A |
| PORTB | EQU 6 | ;PORT B |
| GEN | EQU 7 | ;PORT C NOT USED, SO GENERAL PURPOSE REG |
| CARRY | EQU 0 | ;BIT 0 IS CARRY |
| DCARRY | EQU 1 | ;BIT 1 IS DIGIT CARRY |
| Z | EQU 2 | ;BIT 2 IS ZERO BIT |
| PDOWN | EQU 3 | ;BIT 3 IS POWER DOWN BIT |
| WATCHD | EQU 4 | ;BIT 4 IS WATCH DOG TIMEOUT BIT |
| W | EQU 0 | ;RESULT DESTINATION TO W REGISTER |
| F | EQU 1 | ;RESULT DESTINATION TO F REGISTER |
| BIT0 | EQU 0 | |
| BIT1 | EQU 1 | |
| BIT2 | EQU 2 | |
| BIT3 | EQU 3 | |
| BIT4 | EQU 4 | |
| BIT5 | EQU 5 | |
| BIT6 | EQU 6 | |
| BIT7 | EQU 7 | |
| | ORG 00H | |
| START | movlw #00H | |
| | tris PORTB | ;Port B is eight bit output port |
| | movlw #0FH | ;Port A is four bit input port |
| | tris PORTA | |
| | goto MAIN | |
| MAIN | clrwdt | |
| | movlw #00H | ;All outputs off initially |
| | movwf PORTB | |
| | nop | ;timing delay |

-continued

| | | | |
| --- | --- | --- | --- |
| | nop | | |
| | nop | | |
| | nop | | |
| | nop | | |
| | nop | | |
| | nop | | |
| | nop | | |
| | nop | | |
| AGAIN | clrwdt | | |
| | movf | PORTA, W | ;Read input port |
| | andlw | #0CH | ;Mask off upper 2 bits of nybble |
| | xorlw | #0CH | ;Check for touch detection |
| | btfsc | STATUS, Z | |
| | goto | TOUCH | ;Call touch detection code |
| | goto | AGAIN | |
| XM | movlw | #31H | ;output code for X measurement |
| | movlw | PORTB | |
| | nop | | ;Timing delay |
| | nop | | |
| | nop | | |
| | nop | | |
| | nop | | |
| | nop | | |
| | nop | | |
| | nop | | |
| | nop | | |
| | nop | | |
| XLOOP | clrwt | | ;Reset WDT |
| | movf | PORTA, W | ;Read input port |
| | andlw | #0CH | ;Mask off all bits except 2 msb of nybble |
| | xorlw | #08H | ;Detect y measurement |
| | btfsc | STATUS, Z | |
| | goto | YM | ;Call y measurement code |
| | movf | PORTA, W | ;Read input port |
| | andlw | #0H | ;Check for touch detection |
| | btfsc | STATUS, Z | |
| | goto | TOUCH | ;Call touch detection code |
| | goto | XLOOP | ;continue looking for y measurement phase |
| YM | movlw | #2AH | ;output code for Y measurement |
| | movwf | PORTB | |
| | nop | | |
| | nop | | |
| | nop | | |
| | nop | | |
| | nop | | |
| | nop | | |
| | nop | | |
| | nop | | |
| YLOOP | clrwdt | | |
| | movf | PORTA, W | ;Read input port |
| | andlw | #0CH | ;Mask off upper 2 bits of nybble |
| | xorlw | #0CH | ;Check for touch detection |
| | btfsc | STATUS, Z | |
| | goto | TOUCH | ;Call touch detection code |
| | movf | PORTA, W | ;Read input port |
| | andlw | #03H | ;Mask off all bits except 2 lsb |
| | xlorlw | #01H | ;Detect x measurement |
| | btfsc | STATUS, Z | |
| | goto | XM | ;Call x measurement code |
| | goto | YLOOP | ;look for touch detection phase |
| TOUCH | movlw | #3EH | ;output code for touch detection |
| | movwf | PORTB | |
| | nop | | ;Timing delay |
| | nop | | |
| | nop | | |
| | nop | | |
| | nop | | |
| | nop | | |
| | nop | | |
| | nop | | |
| | nop | | |
| | nop | | |

-continued

```
            nop
            nop
            nop
            nop
            nop
            nop
            nop
            nop
            nop
            nop
            nop
TLOOP       clrwdt                      ;Reset WDT
            movf        PORTA, W        ;Read input port
            andlw       #03H            :Mask off all bits except 2 lsb
            xorlw       #01H            ;Detect x measurement
            btfsc       STATUS, Z
            goto        XM              ;Call x measurement code
            movf        PORTA, W        ;Read input port
            andlw       #0CH            ;Mask off all bits except 2
                                          msb of nybble
            xorlw       #08H            ;Detect y measurement
            btfsc       STATUS, Z
            goto        YM              ; Call y measurement code
            goto        TLOOP           ;continue looking for
                                          x measurement
            ORG 01FFH
RESET       goto        START           ;Reset vector back to start
                                          of code.
            END
```

What is claimed is:

1. A converter for connection between an electrographic sensor and an electrographic controller, and comprising:
   (a) a first set of contacts for connection to the sensor;
   (b) a second set of contacts for connection to the controller; and one of:
   (c) an emulator for emulating at the second set of contacts:
      (i) a four-wire sensor when the first set of contacts is connected to a five-wire sensor and a second set of contacts is connected to a four-wire controller; and/or
      (ii) a five-wire sensor when the first set of contacts is connected to a four-wire sensor and a second set of contacts is connected to a five-wire controller: and
   (d) an emulator for emulating at the first set of contacts:
      (i) a five-wire sensor when the first set of contacts is connected to a four-wire sensor and a second set of contacts is connected to a five-wire controller; and/or
      (ii) a four-wire sensor when the first set of contacts is connected to a five-wire sensor and a second set of contacts is connected to a four-wire controller.

2. A converter according to claim 1, for connection between a resistive touchscreen and a controller for a resistive touchscreen.

3. A converter according to claim 1, in which the emulator can additionally emulate at the second set of contacts:
   (iii) a five-wire sensor when the first set of contacts is connected to a five-wire sensor and the second set of contacts is connected to a five-wire controller; and/or
   (iv) a four-wire sensor when the first set of contacts is connected to a four-wire sensor and the second set of contacts is connected to a four-wire controller.

4. A converter according to claim 1, which additionally comprises:
   (d) a first device that can determine which of a four and five-wire sensor is connected to the first set of contacts and/or which of a four and five-wire controller is connected to the second set of contacts; and which can, at least in part from such determination, cause the emulator to effect an appropriate emulation.

5. A converter according to claim 1, in which the emulation consists in forming appropriate interconnections between the first set of contacts and the second set of contacts.

6. A converter according to claim 1, in which the emulation consists in reading a signal at a contact of one of the first and second sets, and writing an appropriate signal to a contact of the other of the first and second sets.

7. A converter according to claim 1, in which the emulator has first, second and third states, in which it emulates the sensor in ways appropriate to respectively the controller's:
   (i) state for touch detection;
   (ii) state for measurement of an X-co-ordinate; and
   (iii) state for measurement of a Y-co-ordinate.

8. A converter according to claim 7, in which the emulator is caused to switch between its states by signals from the controller at the second set of contacts.

9. A converter according to claim 4, which can receive from the controller at the second set of contacts power necessary for the emulator to effect an appropriate emulation.

10. A converter according to claim 7, in which the emulator has switches whose states determine the mode of the emulator, the normal states of those switches corresponding to the first state of the emulator.

11. A converter according to claim 1, which additionally comprises:
   (e) a second device that can determine which of a sensor and a controller is connected to one of the sets of contacts; and which can, at least in part from such determination, cause the emulator to effect an appropriate emulation.

12. A converter according to claim 11, in which the second sensor detects whether a voltage exists between contacts of that set, and determines that a controller is connected if a voltage is detected.

13. A converter according to claim 4, in which the first sensor detects which of a four-wire and five-wire screen is connected to a set of contacts by determining the resistance between pairs of said contacts.

14. A converter according to claim 4, in which the first sensor detects which of a four-wire and five-wire controller is connected to a set of contacts by determining voltages between pairs of said contacts.

15. A converter according to claim 1 which, on connection of a sensor to one set of contacts thereof and a controller to another set of contacts thereof:
   (i) determines to which of said sets is connected the sensor and to which of said sets is connected the controller;
   (ii) determines whether the sensor is a four-wire sensor or a five-wire sensor;
   (iii) determines whether the controller is a four-wire controller or a five-wire controller;
   (iv) causes the emulator to adopt first, second and third states appropriate to the type of sensor and type of controller connected, and according to the state from time-to-time adopted by the controller.

16. A converter according to claim 1, pre-connected to a sensor.

17. A connector according to claim 1, pre-connected to a controller.

18. A converter according to claim 8, which can receive from the controller at the second set of contacts power necessary for the switching.

* * * * *